Patented June 9, 1953

2,641,608

UNITED STATES PATENT OFFICE 2,641,608

BASICALLY SUBSTITUTED ALKYL ESTERS OF γ-AROYLARYLBUTYRIC ACIDS AND THEIR SALTS

John W. Cusic, Skokie, Ill., assignor to G. D. Searle & Co., Chicago, Ill., a corporation of Illinois No Drawing. Application July 3, 1950, Serial No. 172,023

17 Claims. (Cl. 260—469)

The present invention relates to basic esters of arylaroylaliphatic acids and, in particular, to esters of N,N-disubstituted aminoalcohol esters of γ-aroylbutyric acids, in which the acid is substituted in the α- or β-position by a further aryl group.

The esters which constitute my invention may be represented by the structural formula

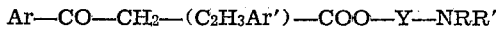

Ar—CO—CH₂—(C₂H₃Ar′)—COO—Y—NRR′ wherein Ar and Ar′ are aryl radicals, Y is a bivalent, aliphatic hydrocarbon radical and wherein NRR′ is a member of the class consisting of dialkylamino radicals and heterocyclic radicals which are attached to the Y group through a nitrogen in the heterocycle.

In the foregoing structural formula Ar and Ar′ may represent such aryl groups as phenyl, o-, m- and p-tolyl, o-, m- and p-anisyl, fluoro-, chloro-, bromo- and iodophenyl and the like. The Y group represents bivalent, saturated, aliphatic hydrocarbon radicals of from two to eight carbon atoms. These radicals are derived from straight-chain and branched-chain aliphatic hydrocarbons and include radicals such as ethylene, propylene, butylene, amylene, and polymethylene radicals such as trimethylene, tetramethylene, pentamethylene and hexamethylene.

Among the radicals which R and R′ represent are such lower alkyl groups as methyl, ethyl, propyl, butyl, amyl, hexyl, cyclopentyl and cyclohexyl, wherein the propyl, butyl, amyl and hexyl groups may be either of the straight-chain or branched-chain type. The radical NRR′ may also be a part of a nitrogen containing heterocyclic group such as a N-piperidino, N-lupetidino, N-pyrrolidino, N′-alkyl-N-piperazino or morpholino group.

The organic bases of the foregoing type form salts with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, oxalic, ascorbic and related acids. They also form quaternary ammonium salts with a variety of organic esters of sulfuric, hydrohalic and aromatic acids. Among such esters are methyl chloride and bromide, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

It is the object of this invention to provide novel chemical substances of the foregoing type. Certain of them are valuable as intermediates in chemical synthesis. For example, new therapeutic agents may be obtained by reduction of the carbonyl group adjoining the Ar group to a carbinol and to a methylene group.

The esters of this invention have been found to possess a number of highly useful therapeutic properties. Thus the acid addition salts have a strong regulatory effect on the cardiovascular system. In some respects this effect on cardiac irregularities is qualitatively similar but quantitatively superior to that of quinidine. Other compounds, especially the quaternary salts, have a ganglion blocking action and act as sympathicolytics and parasympathicolytics. Further, some of these compounds are useful active ingredients in parasiticidal compositions. In the examples quantities of materials are given as parts by weight, uncorrected temperatures as degrees centigrade (°C.) and pressures during vacuum distillation as millimeters (mm.) of mercury.

EXAMPLE 1

*γ-benzoyl-β-phenylbutyric acid ester of diethylaminoethanol*

A mixture of 300 parts of γ-benzoyl-β-phenylbutyric acid and 160 parts of diethylaminoethyl chloride in 3150 parts of anhydrous propanol is heated at refluxing temperature with stirring for 3–4 hours. The solution is concentrated and the concentrate taken up in water. The aqueous solution is made alkaline by addition of a solution of sodium carbonate and extracted with ether. The ether extract is dried over anhydrous potassium carbonate, filtered and evaporated. The γ-benzoyl-β-phenylbutyric acid ester of diethylaminoethanol is distilled at about 236–8° C. and 1 mm. pressure.

Treatment of an ether solution of the base with a 25% solution of hydrogen chloride in isopropanol yields an oily hydrochloride which solidifies on standing in the refrigerator. Recrystallization from ethyl acetate yields colorless crystals melting at about 85–86° C.

EXAMPLE 2

*γ-benzoyl-β-phenylbutyric acid ester of (β-hydroxyethyl) diethylmethylammonium iodide*

One hundred parts of γ-benzoyl-β-phenylbutyric ester of diethylaminoethanol are heated with a solution of 332 parts of methyl iodide in 3200 parts of butanone at 85° C. in a shielded pressure bottle. A solid precipitate begins to form within an hour. After 2 hours of heating the mixture is cooled, filtered and washed well with ether. The γ-benzoyl-β-phenylbutyric acid ester of (β-hydroxyethyl)-diethylmethylammonium iodide, after recrystallization from ethanol using charcoal as a clarifying agent, melts at about 117–118° C. The iodide is converted to the acid tartrate by treatment with ½ mol. of tartaric acid and ½ mol of silver tartrate in cold, absolute methanol. The silver bromide is filtered off and the filtrate evaporated in vacuo. The cation has the structural formula

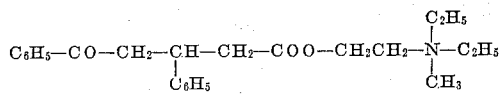

EXAMPLE 3

γ-benzoyl-α-phenylbutyric acid ester of diethylaminoethanol

A mixture of 268 parts of γ-benzoyl-α-phenylbutyric acid and 135 parts of β-chloroethyl-diethylamine in 1600 parts of isopropanol is heated at refluxing temperature with stirring for 2 hours. The resulting solution is concentrated and made alkaline by the addition of dilute sodium carbonate solution. The alkaline solution is extracted with ether and the ether extract is dried over potassium carbonate, filtered and evaporated. The γ-benzoyl-α-phenylbutyric acid ester of diethylaminoethanol is distilled at about 220–222° C. at 2 mm. pressure. An ether solution of the base is treated with a 25% solution of hydrogen chloride in anhydrous isopropanol to produce a sticky hydrochloride which solidifies within a few hours at 0° C. After recrystallization from ethyl acetate, the hydrochloride melts at about 63–65° C.

EXAMPLE 4

γ-benzoyl-α-phenylbutyric acid ester of (β-hydroxyethyl) diethylmethylammonium bromide In a shielded pressure bottle 120 parts of the γ-benzoyl-α-phenylbutyric acid ester of diethylaminoethanol are heated with a solution of 120 parts of methyl bromide in 400 parts of butanone for 2 hours. After a short time of storage at 0° C. the γ-benzoyl-α-phenylbutyric acid ester of (β-hydroxyethyl) diethylmethylammonium bromide solidifies. It melts at about 107–108° C. The bromide is converted into the nitrate by treatment with an equimolar amount of silver nitrate in a large volume of absolute methanol. The silver bromide is filtered off and the filtrate is evaporated in vacuo. The residue is washed with ether and butanone. The cation has the structural formula

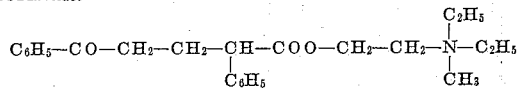

EXAMPLE 5

γ-(o-anisoyl)-β-(p-chlorophenyl) butyric acid ester of δ-dimethylaminobutanol

γ-(o-anisoyl)-β-(p-chlorophenyl) butyric acid is prepared by the method of C. R. Hauser, R. S. Yost, and B. I. Ringler (J. org. chem. 14, 261; 1949) from o-methoxyacetophenone and ethyl p-chlorocinnamate. A mixture of 332 parts of this acid and 135 parts of δ-dimethylaminobutyl chloride in 2000 parts of anhydrous isopropanol is stirred and heated at refluxing temperature for 3 hours. Most of the volatile material is removed in vacuo and the residue treated with an excess of a dilute aqueous sodium carbonate solution. The free base is then extracted by means of ether and the extract is dried over anhydrous sodium sulfate, filtered and evaporated. The δ-dimethylaminobutanol ester of γ-(o-anisoyl)-β-(p-chlorophenyl) butyric acid is thus obtained as an oil. It has the structural formula

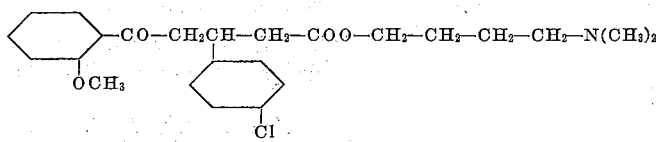

EXAMPLE 6

γ-benzoyl-α-(p-tolyl)butyric acid ester of N-(β-hydroxyethyl) morpholine

γ-(p-tolyl) glutaryl anhydride is prepared by the method of E. C. Horning and A. F. Finelli (J. Am. Chem. Soc. 71:3204; 1949) and treated by the method described in the same article with benzene in the presence of aluminum bromide to form γ-benzoyl-α-(p-tolyl) butyric acid. 190 parts of this acid are then heated with 100 parts of N-(β-chloroethyl) morpholine in 2000 parts of anhydrous isopropanol at boiling temperature for 4 hours under reflux with strong mechanical agitation. The solvent is removed with vacuum distillation and the concentrate treated with a dilute sodium hydroxide solution. The base is extracted with ether and the ether extract is dried over anhydrous potassium carbonate, filtered and evaporated. The residual oil consists of the γ-benzoyl-α-(p-tolyl) butyric acid ester of N-(β-hydroxyethyl) morpholine, which has the structural formula

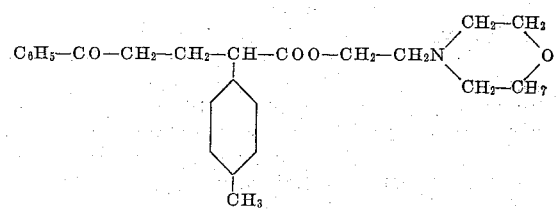

I claim:

1. The new group of organic compounds consisting of the esters of aroylarylbutyric acids of the structural formula

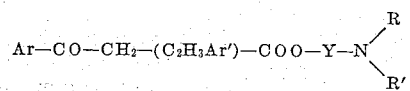

and the non-toxic salts thereof, wherein Ar and Ar' are members of the group consisting of phenyl radicals and halogen-, lower alkyl- and methoxy-substituted phenyl radicals, Y is a lower alkylene radical, and NRR' is a member of the class consisting of lower dialkylamino and morpholino radicals.

2. The dialkylaminoalkyl esters of γ-benzoyl-β-arylbutyric acids of the structural formula

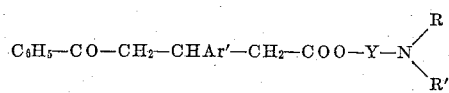

wherein Ar' is a lower monocyclic, aromatic, hydrocarbon radical, Y is a lower saturated, alkylene radical and R and R' are lower alkyl radicals.

3. The dialkylaminoalkyl esters of γ-benzoyl-β-phenylbutyric acid of the structural formula

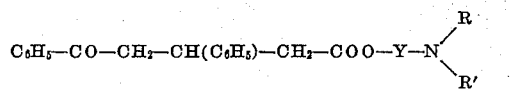

wherein Y is a lower saturated, alkylene radical and R and R' are lower alkyl radicals.

4. The dialkylaminoethyl esters of γ-benzoyl-β-phenylbutyric acid of the structural formula

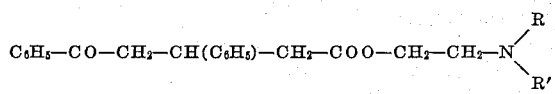

wherein R and R' are lower alkyl radicals.

5. The quaternary ammonium salts of dialkylaminoalkyl esters of γ-benzoyl-β-arylbutyric acids of the structural formula

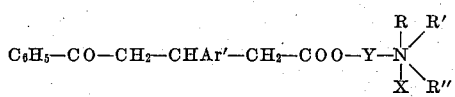

wherein Ar' is a lower monocyclic, aromatic, hydrocarbon radical, Y is a lower saturated, alkylene radical, R, R' and R'' are lower alkyl radicals and X is one equivalent of a non-toxic anion.

6. The quaternary ammonium salts of dialkylaminoalkyl esters of γ-benzoyl-β-phenylbutyric acids of the structural formula

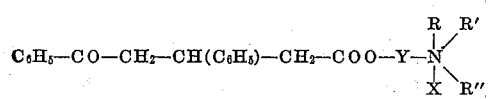

wherein Y is a lower saturated, alkylene radical, R, R' and R'' are lower alkyl radicals and X is one equivalent of a non-toxic anion.

7. The quaternary ammonium salts of dialkylaminoethyl esters of γ-benzoyl-β-phenylbutyric acids of the structural formula

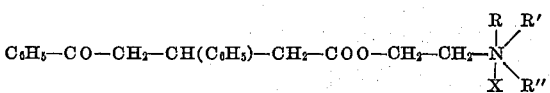

wherein R, R' and R'' are lower alkyl radicals and X is one equivalent of a non-toxic anion.

8. The dialkylaminoalkyl esters of γ-benzoyl-α-arylbutyric acids of the structural formula

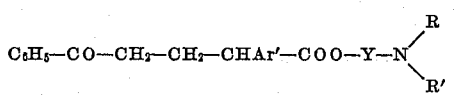

wherein Ar' is a lower monocyclic, aromatic, hydrocarbon radical, Y is a lower saturated, alkylene radical and R and R' are lower alkyl radicals.

9. The dialkylaminoalkyl esters of γ-benzoyl-α-phenylbutyric acid of the structural formula

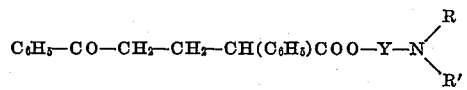

wherein Y is a lower saturated, alkylene radical and R and R' are lower alkyl radicals.

10. The dialkylaminoethyl esters of γ-benzoyl-α-phenylbutyric acid of the structural formula

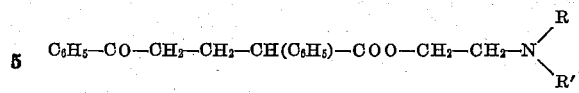

wherein R and R' are lower alkyl radicals.

11. The quaternary ammonium salts of dialkylaminoalkyl esters of γ-benzoyl-α-phenylbutyric acids of the structural formula

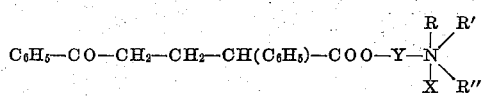

wherein Y is a lower saturated, alkylene radical, R, R' and R'' are lower alkyl radicals and X is one equivalent of a non-toxic anion.

12. The quaternary ammonium salts of dialkylaminoethyl esters of γ-benzoyl-α-phenylbutyric acids of the structural formula

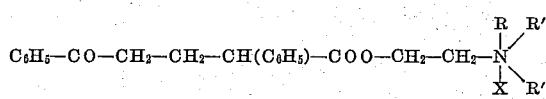

wherein R, R' and R'' are lower alkyl radicals and X is one equivalent of a non-toxic anion.

13. The quaternary ammonium salts of dialkylaminoalkyl esters of γ-benzoyl-α-arylbutyric esters of the structural formula

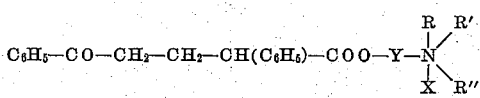

wherein Y is a lower saturated, bivalent, aliphatic hydrocarbon radical, R, R' and R'' are lower alkyl radicals and X is one equivalent of a non-toxic anion.

14.

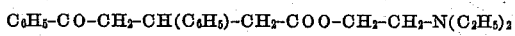

15.

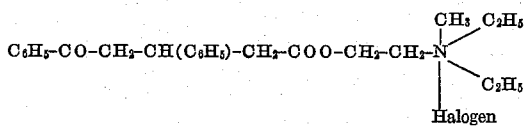

16.

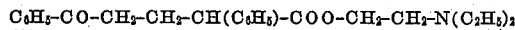

17.

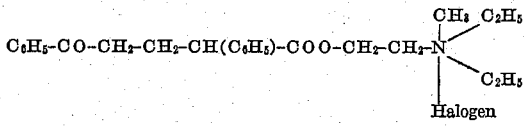

JOHN W. CUSIC.

References Cited in the file of this patent

Blicke et al., J. Am. Chem. Soc., vol. 64, p. 430.
Borsche, Chem. Abs., vol. 4, p. 590.